April 11, 1961 A. W. HUGHES 2,978,737
APPARATUS FOR GASSING ANIMALS AND FOWL PRELIMINARY TO SLAUGHTER
Filed Sept. 26, 1955 3 Sheets-Sheet 3
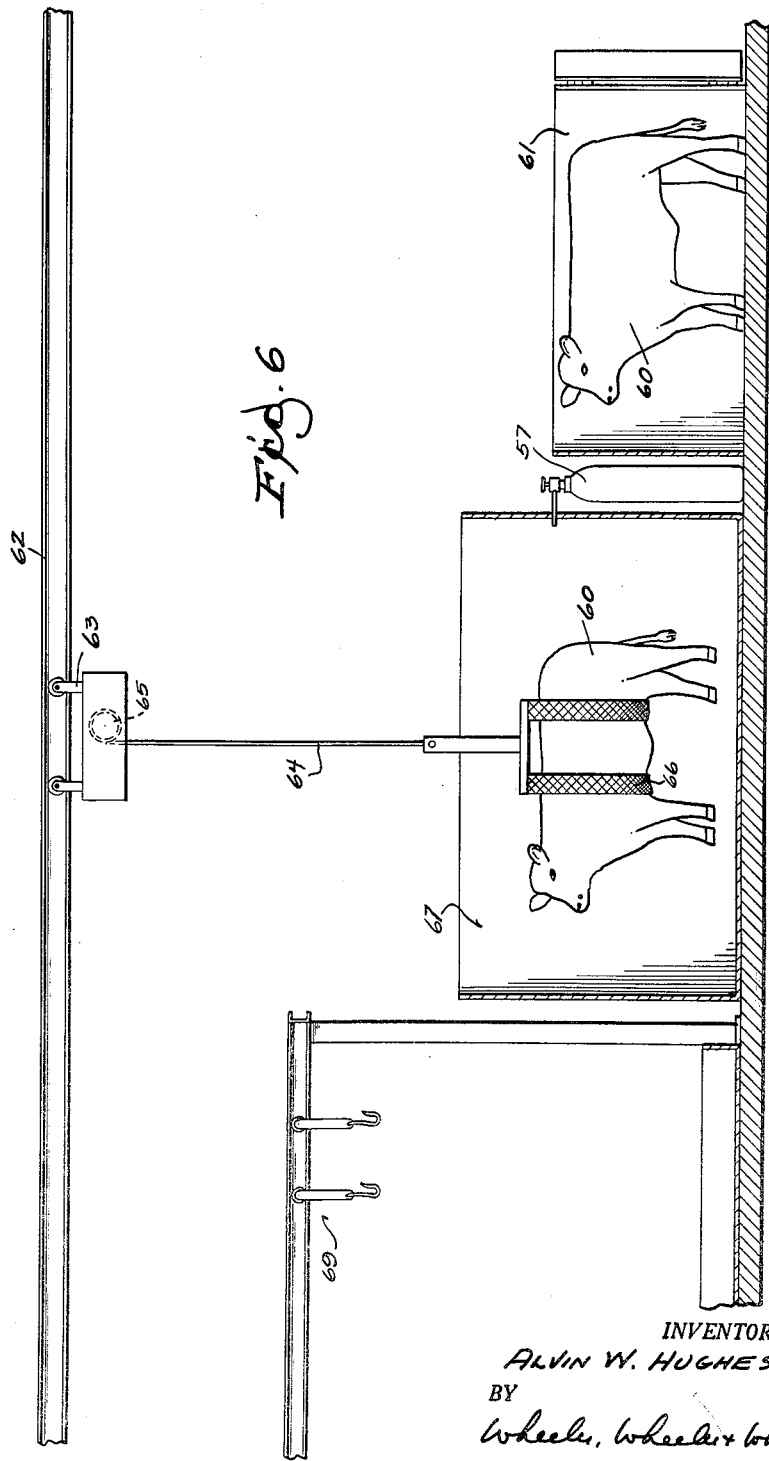
INVENTOR.
ALVIN W. HUGHES
BY
Wheeler, Wheeler + Wheeler
ATTORNEYS

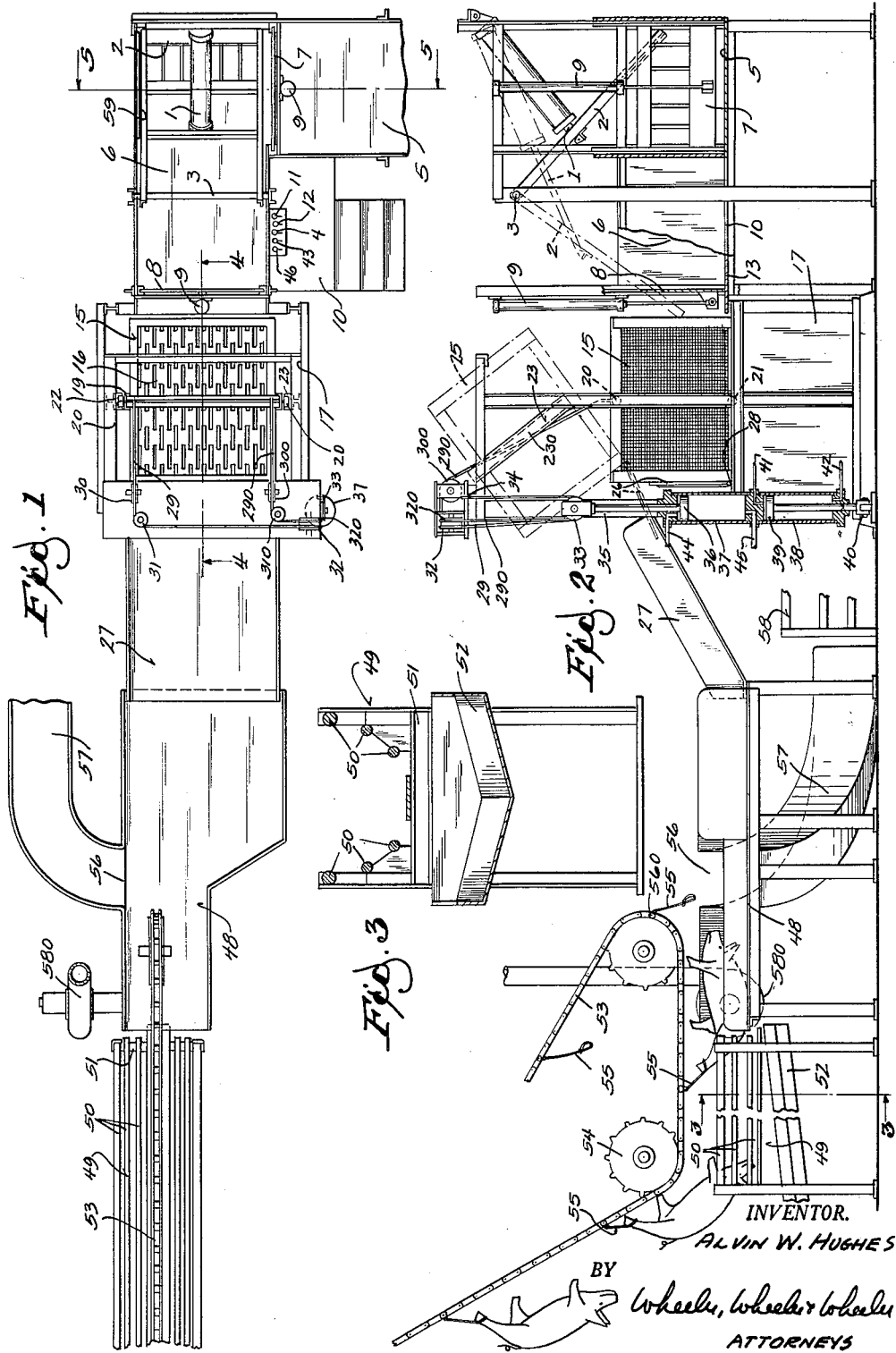

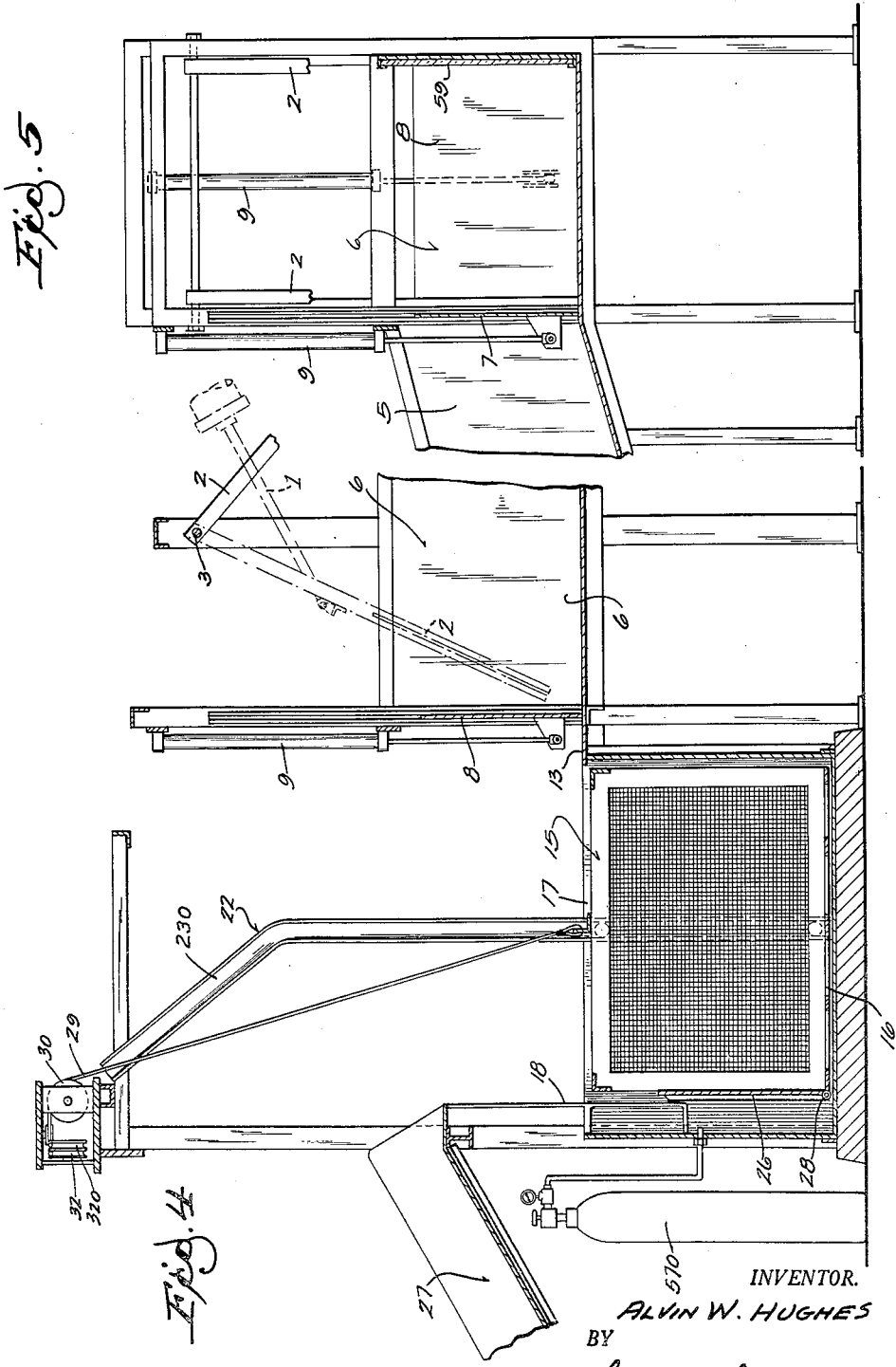

United States Patent Office 2,978,737
Patented Apr. 11, 1961

2,978,737

APPARATUS FOR GASSING ANIMALS AND FOWL PRELIMINARY TO SLAUGHTER

Alvin W. Hughes, Milwaukee, Wis.
(4N194 Church Road, Bensenville, Ill.)

Filed Sept. 26, 1955, Ser. No. 536,389

14 Claims. (Cl. 17—1)

This invention relates to apparatus for gassing animals and fowl preliminary to slaughter or surgery or for other purposes.

One of the problems involved in slaughtering is the struggling of the animal or fowl when it is seized and shackled. According to the present invention, the creature to be slaughtered is placed, either individually or together with an appropriate number of other creatures, in a gassing chamber and, after gassing, is pulled prone along a bleeding rack so that the creature preferably is not even lifted by its shackle until bleeding is complete or advanced.

Large animals such as cattle may be lifted in a sling and lowered into a gas chamber, desirably being held with their feet free of the floor until rendered inert by the gas. Smaller creatures may be admitted into an elevator cage which lowers them into the gassing chamber. Any creature may be slid or dropped into the chamber but some type of hoist is used to remove the inert creature.

In preferred practice, I use a metering chamber having gates at the inlet and outlet to preclude stampeding and to enable a limited number of creatures to be advanced toward the gassing chamber.

In a disclosed arrangement, a cage is movable as an elevator to three positions. It receives the creatures at an intermediate height. It is thereupon lowered into a gassing chamber where creatures are asphyxiated by gas, which, being heavier than air, remains by gravity. When the creatures are immobilized and fall to the floor of the cage, the cage is raised to an elevated position in which its bottom is tilted to discharge the creatures by gravity down a chute on to a shackling table and bleeding rack. A hoist operates across the end of this table to propel successive shackled creatures along the table and rack, ultimately lifting the creature.

An emergency return chute opening from the side of the table permits the escape and return to the pen of creatures which revive on the shackling table. The gassing is ordinarily sufficient so that the creatures will not revive, but if anything goes wrong with the shackling procedure due to the absence of the operator or an accident to the hoist, the creatures can be released and returned without injury or inconvenience.

In the accompanying drawings:

Fig. 1 is a view in plan of apparatus embodying the invention.

Fig. 2 is a view in side elevation of the apparatus shown in Fig. 1.

Fig. 3 is a detail view taken in section on the line 3—3 of Fig. 2.

Fig. 4 is a view on an enlarged scale taken in section on the line 4—4 of Fig. 1.

Fig. 5 is a detail view on an enlarged scale taken in section on line 5—5 of Fig. 1.

Fig. 6 is a view partially in side elevation and partially in section showing a modified embodiment.

Relatively small creatures to be slaughtered are caused by attendants to enter an elevated metering chamber 6 which constitutes a continuation of the ramp desirably provided to enable the creatures to walk under their own power from their pen (not shown). Both the ramp 5 and the metering chamber 6 are designed to preclude escape of the creatures to be slaughtered. In the case of hogs, for example, it is sufficient to provide side walls sufficiently high so that the animals cannot climb over them.

Gates 7 and 8 are provided at the inlet and outlet of the metering chamber 6 and both are operated by double-acting air cylinders or the like as indicated at 9 in Fig. 2. These gates are subject to full control by an operator standing on the platform 10 which is provided with means such as valve levers 11 and 12 controlling the valves (not shown) which admit air to the cylinders 9 controlling the respective gates 7 and 8. In the case of hogs, four or five 250 pound hogs can be passed simultaneously into the gassing chamber and the provision of the gates 7 and 8 enables the operator to prevent more than five hogs from reaching the gassing chamber. In case the operator fails to lower the gate 7 soon enough to prevent more than five hogs from entering the metering chamber 6, he has a second opportunity to exclude the overage from the gassing chamber by manipulation of the gate 8.

The right angular form of the metering chamber effects economy of space, but it also places all of the creatures in the metering chamber within easy reach of the operator who, by means of electric prods of conventional design causes creatures to move through the metering chamber toward the elevator cage 15, the floor of which registers with runway portion 13 in the intermediate position of the cage in which the cage is loaded.

As a further or alternative means of requiring the creatures to move through the metering chamber toward the elevator cage, the operator may operate valve lever 4 to energize the ram 1 to swing a gate 2 around its fulcrum 3 from the full line position of Fig. 2 toward the dotted line position in which the gate 2 is shown in Fig. 4, thereby forcibly propelling the animals through chamber 6 into the elevator cage.

The elevator cage in which creatures are gassed has a floor and side walls which are preferably foraminous, the side walls being made of expanded metal or screening as shown, and the floor 16 desirably comprising a slotted plate, wherein the slots extend from right to left as viewed in Fig. 1 and are too narrow to permit the feet of the creatures from getting caught. At the same time, a large portion of the total area of the floor should be open so that when the cage is lowered into the gassing chamber 17 the gas will flow readily through the floor of the cage.

Gas in the chamber desirably has a concentration of 70–75 percent at the bottom, the concentration diminishing upwardly. The cage is lowered slowly for two reasons; first, to avoid loss of gas by displacement, and, secondly, to expose the creatures gradually to progressively increasing gas concentrations, thereby minimizing violent reactions.

The cage may be open at both ends but is desirably provided at least at its outlet end with a gate 26 normally folded up against the end of the cage but hinged for movement to a lower position shown in dotted lines in Fig. 2 in which it serves as a drawbridge across which the creatures are discharged. The inlet end of the cage can have a similar arrangement but needs no gate because the creatures are adequately confined both in the intermediate position of the cage and in its lowered position, while in the upper position of the cage the animals are inert by reason of their asphyxiation in the tank 17.

The cage comprises side members 19 which carry rollers 20, 21 near their lower and upper ends. These rollers are guided in channels 22 and 23 which are correspondingly curved at their upper ends 230 from upright to oblique positions as clearly shown in Figs. 2 and 4. The ways provided by the channels 22 and 23 extend downwardly into the gassing chamber 17 and their upper ends are at such a level that in the elevated position of the cage shown in dotted lines at 25 in Fig. 2, the cage bottom will be tilted, as by the tilting of the entire cage, to discharge the gassed creatures from its floor by gravity across its drawbridge gate 26 onto the chute 27.

Gate 26 is hinged to the cage at 28 for pivotal movement between the dotted line position shown in Fig. 2 and the upright position indicated in Fig. 4, in which the gate is disposed transversely across the end of the cage and guided by rails 18. In the tilted position of the cage, the drawbridge gate 26 falls open to rest on the chute 27 as shown. As the cage descends, the free end of gate 26 is held by the guide rails 18 and forced into its closed position against the end of the cage.

For moving the cage, the arrangement is desirably such that the operation of the cage is rapid above the level of the gassing chamber but is relatively slow when the cage is moving into or out of the gassing chamber, the object being to minimize such turbulence as might lose some of the gas from the chamber.

In the organization shown, the cage is operated by a pair of cables 29 and 290 connected with the cage and passing over sheaves 30 and 300. Thence the cables pass about sheaves 31 and 310 and sheaves 32 and 320 and downwardly to a pair of sheaves, only one of which is shown at 33 in Fig. 2. Thence the cables pass upwardly to an anchorage at 34 on the frame.

Sheaves 33 are carried by the piston rod 35 of a piston 36 in a cylinder 37. This cylinder is connected with another cylinder 38. The piston 39 in cylinder 38 has a pivotal anchorage at 40 to and from which the pair of cylinders 37 and 38 are bodily movable in response to pressures admitted above and below piston 39 through connections 41 and 42, subject to the control of valve lever 43. Similar connections 44, 45 to the upper and lower ends of cylinder 37 are controlled by valve lever 46.

It will be apparent that any lengthening of the distance between the sheaves 33 and the anchorage 40 will lower the cage, while any shortening of such distance will raise the cage. The length of travel of the respective pistons in the respective cylinders is such that each accounts for approximately half of the total required cage movement. In practice, the pressure connections to cylinders 38 through ducts 41 and 42 are throttled so that the movement controlled through these connections is relatively slow, this being used for the movement of the cage either upwardly or downwardly in the gassing chamber. The connections to cylinder 37 are unthrottled (here indicated only by the relatively larger size) and the the movement of the cage from the loading position upwardly to the discharge position shown in dotted lines in Fig. 2 is, therefore, relatively rapid.

The chute 27 discharges gassed creatures on a shackling table 48. Beyond the table 48 extends a bleeding rack 49 made of generally parallel bars 50 crossconnected at intervals by webs 51 (Fig. 3). Beneath this rack is a blood-collecting trough 52.

A conveyor 53 extends along the shackling table and bleeding rack and thence upwardly about sheave 54. Instead of being loose, and thus requiring separate handling in accordance with conventional practice, the shackles 55 comprise slip nooses or the like in permanent connection with the conveyor and of such length that the operator can readily engage them with the foot or feet of the creatures to be slaughtered. Thereupon the movement of the conveyor draws the successive creatures from the shackling table onto the bleeding rack, where they are stuck while prone. While still unconscious, they are bled and only thereafter are they lifted upwardly by the conveyor without any abrupt change of direction or shock to the creatures.

Optionally, there is an emergency exit door at 56 opening from the shackling table to a chute 57 which leads laterally and rearwardly toward a runway 58 through which any creature which recovers consciousness on the shackling table can be permitted to return to the pen.

This embodiment of the invention is used as follows:

In operation, the entire gassing operation is subject to control by a single operator at a station represented by platform 10. Another operator can handle the shackling without difficulty. He is not obliged to stoop or lift, as the creatures are all at table level.

The creatures to be gassed are urged up the ramp 5 and past the elevated door 7 until the requisite number has entered the metering chamber 6, whereupon door 7 is lowered and door 8 is raised and the creatures are prodded out of the metering chamber and into the cage 15. As soon as the requisite number of creatures is in the cage, the door 8 is lowered and the cage is lowered into the gas-filled chamber 17. The gas used is desirably carbon dioxide or other harmless asphyxiating gas, although any gas may be employed. It is even possible to kill the creatures by gassing, but it is preferred to leave them alive but unconscious.

The operator can look directly into the gassing chamber to note the progress of the gassing operation. Only a short time is required. When the creatures drop to the floor of the cage, the operator manipulates valve handles 43 and 46 successively to raise the cage from its lowermost to its uppermost position while the gate 26 drops open and the unconscious creatures slide by gravity from the cage and down the chute 27 onto the table 48. The lowermost creature to reach the table has its movement arrested by the horizontal length of table. The shackle is made fast to its ankle or foot and if the shackle is not permanently connected to the chain, it is then hooked onto a stud 560 of the hoist conveyor which draws it along the table and bleeding rack. As the animal reaches the rack, it is stuck while in a prone position, this being a new procedure made possible by the fact that the animals are unconscious. The animal bleeds as it moves along the rack and the bleeding is continued as the animal is lifted from the rack. Conclusion of the bleeding may take place with the animal suspended in the usual manner, but there is no struggling such as has heretofore resulted in injury to the flesh, since the bleeding which occurs while the animal is prone results in such loss of strength as to make struggling impossible even if the animal recovers from the gassing.

Meantime, the operator in charge of the gassing operation will have admitted a number of creatures into the metering chamber and, as soon as the creatures have been discharged from the cage, the cage is lowered by manipulation of valve lever 46 to its intermediate position shown in Fig. 2. This closes the drawbridge discharge gate 26 and the cage can be re-filled while the operator at the shackling table is disposing of the creatures previously delivered thereto. Ordinarily, the gassing operation can be started before all of the creatures have been carried off by the hoist conveyor from the shackling table. Thus only slight delays will be involved. Yet the apparatus uses a minimum amount of gas and is relatively very inexpensive.

Movement of the gassing cage into and from the gassing chamber 17 should not be so rapid as to displace undue quantities of gas. Makeup from the supply tank 570 will naturally be added to replace any of the gas which is lost. To protect the operator at the shackling table, an exhaust blower is desirably used at 580 to withdraw gas and odors from that station.

Wherever possible, it is desired to encourage movement of creatures along the desired path from the receiving pen up the ramp and through the metering chamber and thence on into the cage. Particularly after a creature has been stopped in the metering chamber, he may hesitate to move forward again. To encourage such movement, I may provide the cage with a mirror or mirrors, as shown at 59, and I may also provide at or beyond the cage means such as a blower directed toward the runway for supplying an odor or odors appropriate for the attraction of the creature urged thereto.

While the arrangement as already described will take care of hogs, sheep and smaller creatures such as poultry, I prefer a different embodiment of the invention for large animals such as cattle or horses. The large animals, here represented by the steer 60 (Fig. 6) are admitted to a waiting stall 61 beneath the overhead track 62 along which a conveyor track 63 is operable. The hoisting cable 64 is connected with a winch drum 65 on the carriage and supports a sling 66 which is passed beneath the belly of the animal while the animal is in the waiting stall 61. Thereupon, the winch is operated to lift the animal above stall 61 and the carriage moves along track 62 and the animal is lowered into the gas chamber 67 as indicated in Fig. 6. Desirably, the feet of the animal are not permitted to touch the floor and the animal is gassed while thus suspended in the gas chamber. An animal which does not have support from its feet is helpless in the sling and therefore struggling is minimized and injury to the flesh is made impossible.

When the animal becomes unconscious, it is lifted from gas chamber 67 by the hoisting drum 65 and carriage 63 moves on along its track 62, the animal thereupon being deposited for any purpose, such as surgery, bleeding, or dressing. Bleeding may take place upon the floor instead of on a rack such as that shown in Fig. 1. The conveyor 69 is merely a suggestive means of carrying off the carcass for butchering after bleeding.

I claim:

1. The combination with a gassing chamber disposed above floor level and in which gas is retained by gravity, of an elevator cage and guides upon which said cage is movable vertically into and from the chamber, a loading ramp having a terminal loading station portion with which the cage is registrable, a discharge chute having an unloading station portion with which the cage is registrable, together with means for tilting the bottom of the cage at the unloading station to deliver gassed creatures by gravity onto such chute.

2. The device of claim 1 in which a metering chamber intervenes between the ramp and the cage in the loading position of the latter, said metering chamber comprising inlet and outlet doors and means for the operation thereof in alternation for determining the number of creatures to be admitted to the cage.

3. In a device for the gassing of living creatures, the combination with a tank-like gassing chamber open at its top and in which gas heavier than air is retained by gravity, of gassing cage ways extending from said chamber upwardly, a gassing cage having guide means operating in said ways, said ways including means adapted in the raised position of the cage to tilt the bottom of the cage for discharge of its contents, a chute positioned to receive contents of the cage from the tilted bottom thereof, a runway having a delivery portion with which said cage is operatively registrable in an intermediate cage position above said gassing chamber, said cage being adapted to receive creatures from the runway in said intermediate cage position, means for actuating the cage from its lower position in said chamber through its raised position for discharge onto said chute and including means for lowering the cage from its raised position to its intermediate position and thence downwardly into said gassing chamber.

4. The device of claim 3 in further combination with a shackling table to which said chute leads.

5. The device of claim 3 in further combination with a shackling table to which said chute leads, said table comprising a bleeding rack having blood collecting means thereunder, together with a hoist conveyor having a run extending along the shackling table for propelling creatures along said table during bleeding and for lifting such creatures therefrom.

6. The device of claim 3 in further combination with a shackling table to which said chute leads, together with a return runway opening from said shackling table for discharging resuscitated creatures therefrom.

7. The device of claim 3 in which the runway leading to said intermediate cage position includes a metering portion having inlet and exit doors and operator-controlled means for the opening and closing of said doors.

8. The device of claim 7, said runway having an angled intermediate runway portion provided with an operator platform within the angle and about which creatures to be slaughtered move between the inlet and outlet doors whereby to be within reach of the operator in the course of such movement.

9. A device of the character described comprising the combination with a tank-like gassing chamber having a continuous bottom and side walls and an open top and containing a gas heavier than air for rendering a living creature unconscious, means for delivering creatures to be slaughtered upwardly at least to the level of the top of said chamber, an elevator cage having guiding ways guiding it for movement into said chamber and upwardly therefrom, means for actuating said cage between a position in said chamber and a position elevated materially above the chamber, said cage having an intermediate position in which it registers with a portion of said creature-delivering means to receive creatures therefrom, means for controlling the movement of creatures along said creature-delivering means for the controlled delivery of selected numbers of such creatures into said elevator cage for lowering thereby into said chamber and for elevating said chamber to a discharge position above said creature delivering means, and means for tilting the bottom of the elevator cage in the last mentioned position thereof for the discharge of creatures rendered unconscious by the gas in the chamber.

10. The device of claim 9 in which the means for tilting the bottom of the elevator cage for the discharge of creatures therefrom comprises curved end portions on said ways, and guide means connected with the cage and slidable along said portions to tilt the entire cage as the guide means traverses the curved portions of the ways.

11. The device of claim 9 in which the means for controlling creature delivery comprises a plurality of spaced gates and means for the selective manipulation thereof between open and closed positions.

12. The device of claim 11 in further combination with means providing an operator station, a runway extending about two sides of said station between said gates, whereby creatures in the runway between said gates are within reach of an operator at said station, means accessible to the operator at said station for controlling said gates and movement of said cage.

13. In a device for guiding creatures to slaughter, the combination with a runway along which the creatures are to move, of means for introducing the odor of food into an advanced portion of the runway in further combination with a gassing chamber to which the runway leads, said odor-introducing means comprising an inlet adjacent said chamber and directed toward the runway.

14. In a device for guiding creatures to slaughter, the combination with an elongated runway along which the creatures are to move, of means for introducing the odor of food into an advanced portion of the runway in further combination with a gassing chamber beneath the end of the runway, a gassing cage vertically reciprocable between the level of the chamber and the level of the runway, said odor-introducing means comprising a blower having a discharge opening beyond the cage and opposite the end of the runway and directed toward said runway end.

References Cited in the file of this patent

UNITED STATES PATENTS

| | | |
|---|---|---|
| 56,481 | Williams | July 17, 1866 |
| 570,913 | Donaldson | Nov. 10, 1896 |
| 627,184 | Graves | June 20, 1899 |
| 1,226,598 | Roberts | May 15, 1917 |
| 1,317,745 | Watson et al. | Oct. 7, 1919 |
| 1,994,646 | Heath | Mar. 19, 1935 |
| 2,146,689 | Simon | Feb. 7, 1939 |
| 2,513,877 | Kahn et al. | July 4, 1950 |
| 2,526,037 | Murphy | Oct. 17, 1950 |
| 2,620,589 | Jones | Dec. 9, 1952 |
| 2,733,477 | Murphy | Feb. 7, 1956 |
| 2,737,683 | Regensburger | Mar. 13, 1956 |

FOREIGN PATENTS

| | | |
|---|---|---|
| 517,219 | Germany | Feb. 2, 1931 |